UNITED STATES PATENT OFFICE 2,464,928

PHOSPHOLIPOID CARRIER FOR ANTIOXIDANT

Lloyd A. Hall, Chicago, Ill., assignor to The Griffith Laboratories, Inc., a corporation of Illinois No Drawing. Application July 20, 1945,
Serial No. 606,283

1 Claim. (Cl. 260—398.5)

This invention relates to an antioxidant and more particularly to a phospholipoid carrier for a gallic acid ester antioxidant.

It is an object of this invention to provide an improved antioxidant material for preserving and stabilizing such food substances as lard, oleo oil, chicken fat, turkey fat, butter, peanut butter, salad dressings, mayonnaise, cheese spreads, vegetable oils, fish oils, hydrogenated fats, vitamins A and D, chocolate, cocoa, cocoa butter, coconut fats, essential oils, margarine, and other fatty food products, or food products containing large amounts of fatty matter which are subjected to rancidity development.

It has been known that propyl gallate and other low alkyl esters of gallic acid such as methyl gallate, ethyl gallate, and butyl gallate, have good antioxidant properties. These materials, however, are difficult to introduce to fatty compositions. Prior to the co-pending application of myself and Leon Gershbein, Serial No. 598,900, filed June 11, 1945, the practice had been to dissolve the ester in a volatile solvent, distribute the solvent through the food composition, and then evaporate it. The solvents used were not palatable in food products so that vacuum removal thereof had to be employed and the resulting introduction of the material was expensive and not wholly satisfactory. In large batches of lard, for instance, it has been impossible to get good solubility of propyl gallate, when added alone, and thus the stability protection desired. As with other antioxidants, the addition of propyl gallate alone has required filtration of the treated fatty food to eliminate traces of insoluble antioxidant matter. In other instances, it has been necessary to dissolve antioxidants in solvents such as alcohols or ethers, and then to blow off the solvent. This added step of deodorization is expensive, particularly with products like lard, which is not a large-profit item; and further, only the largest fat, oil, and food processing factories are presently equipped for deodorization. In the co-pending application referred to, an oil carrier for the propyl gallate or similar material is disclosed.

The use of an oil is quite satisfactory for most purposes, but it does have a tendency to lower the melting point of material such as lard, and the amount of oil which may be employed is, therefore, limited.

It has also been known that lecithin has some antioxidant properties, and the material is well known as an emulsifier. It does, however, in many cases have the effect of greatly reducing the viscosity of materials to which it is added, as, for example, in the well known case of chocolate compositions.

I have found that lecithin may be employed as the carrier for antioxidants such as propyl gallate, the gallic acid ester being dissolved in the lecithin, and then this solution introduced to the fatty composition. The lecithin does not have the property of reducing the melting point of the composition in the manner that an oil such as corn oil does. In fact in some cases the introduction of lecithin may increase the melting point or viscosity or both. The composition, therefore, does not have to be employed in critical ranges.

Furthermore in many fatty compositions such as margarines, lecithin is an ingredient which is added for other purposes than merely as an antioxidant. The introduction of it as a carrier for the antioxidant, therefore, involves no extra expense, even for mixing. Enough antioxidant of the propyl gallate type may also be dissolved in lecithin so that complete antioxidant protection may be provided when lecithin is added in the amounts of 0.1% to 0.3%, usually employed when adding lecithin for other purposes, as in chocolate or margarine or shortening.

Preferably I prepare a composition comprising about 96 parts of lecithin and 4 parts of propyl gallate. The lecithin may be, unbleached commercial lecithin. The propyl gallate is incorporated in it in any suitable manner as, for example, by heating the lecithin while agitating, to 170° F. The propyl gallate is then slowly added while agitation is continued. The solution takes some time, usually about 1 hour at this temperature being required. The lecithin solution may then be added to the fat or oil while the latter is hot, before or after refining, and stirring it until it is completely in solution.

The ratio of the lecithin-propyl gallate mixture to the fat or oil is preferably about 4 oz. to 100 lbs., which supplies about 0.01 gram of propyl gallate and 0.24 gram of lecithin per 100 grams. In some cases, where less protection is desired, the ratio may be cut in half, namely, to 2 oz. per 100 lbs., or 0.005 gram of propyl gallate and 0.12 gram of lecithin.

The foregoing detailed description has been given for clearness of understanding only, and no unnecessary limitations should be understood therefrom.

What I claim as new, and desire to secure by Letters Patent, is:

The method of incorporating a normally substantially fat-insoluble gallic acid ester in a fatty material comprising the step of dissolving the ester in a relatively large proportion of molten lecithin and then introducing the molten solution to the fatty composition likewise in a molten state and thoroughly mixing the materials.

LLOYD A. HALL.

REFERENCES CITED

The following references are of record in the file of this patent:

UNITED STATES PATENTS

| Number | Name | Date |
| --- | --- | --- |
| 2,051,257 | Holmes | Aug. 18, 1936 |
| 2,282,811 | Musher | May 12, 1942 |

OTHER REFERENCES

Bergl, Chem. & Ind. pp. 127 and 128, April 1, 1944.